US009707679B1

(12) United States Patent
Bogazzi

(10) Patent No.: US 9,707,679 B1
(45) Date of Patent: Jul. 18, 2017

(54) APPARATUS AND METHODS FOR MOVING OBJECTS NEEDING ECCENTRICALLY-LOCATED SUPPORT DURING MOVING

(71) Applicant: Marco Bogazzi, Marietta, GA (US)

(72) Inventor: Marco Bogazzi, Marietta, GA (US)

(73) Assignee: The Big Green Egg, Inc., Atlanta, GA (US)

( * ) Notice: Subject to any disclaimer, the term of this patent is extended or adjusted under 35 U.S.C. 154(b) by 0 days.

(21) Appl. No.: 14/853,308

(22) Filed: Sep. 14, 2015

Related U.S. Application Data

(60) Provisional application No. 62/049,411, filed on Sep. 12, 2014.

(51) Int. Cl.
*A45F 5/10* (2006.01)
*B25J 1/04* (2006.01)

(52) U.S. Cl.
CPC .. *B25J 1/04* (2013.01); *A45F 5/10* (2013.01)

(58) Field of Classification Search
CPC ... B65G 7/12; A45F 1/10; A45F 1/102; A45F 1/1046; A45F 5/10; A45F 5/102; A45F 5/1046; B25J 1/04
USPC ............... 294/15, 32, 173, 92, 145
See application file for complete search history.

(56) References Cited

U.S. PATENT DOCUMENTS

| | | | | |
|---|---|---|---|---|
| 1,319,433 A * | 10/1919 | Swoboda | ............... | A47J 45/10 220/317 |
| 2,007,039 A * | 7/1935 | Dickson | ............... | A45F 5/102 294/159 |
| 2,594,791 A * | 4/1952 | Motl | ............... | A01K 5/01 294/32 |
| 4,059,033 A * | 11/1977 | Johnson | ............... | B67B 7/18 81/125 |
| 4,641,874 A * | 2/1987 | Grenzer | ............... | B63C 13/00 114/343 |
| 4,802,391 A * | 2/1989 | Willhoite | ............ | B25B 27/0035 29/278 |
| 5,507,544 A * | 4/1996 | McQuade | ............... | A45F 5/10 220/759 |
| 7,213,851 B2 * | 5/2007 | Mann | ............... | A47J 36/16 294/131 |
| 8,042,849 B2 * | 10/2011 | Pratt | ............... | B65G 7/12 294/19.3 |

(Continued)

*Primary Examiner* — Dean Kramer
(74) *Attorney, Agent, or Firm* — Merchant & Gould PC; R. Stevan Coursey

(57) ABSTRACT

The present disclosure describes an apparatus for moving objects from above that need support at eccentric locations thereof during moving and methods of using the apparatus to move such objects. The apparatus restricts objects from moving relative to the apparatus in multiple directions and, together with the apparatus' support of the objects from below at multiple eccentric locations, provides stability and reduces the possibility of the user being injured or other things being damaged during the object's movement. According to an example embodiment, the apparatus comprises a hand tool having a handle and a plurality of interface members secured to the handle. The handle has an ergonometric shape for comfortable grasping by a user. The interface members depend from and extend outward from the handle to interact with and support an object being moved at multiple eccentric object locations.

3 Claims, 4 Drawing Sheets

(56) References Cited

U.S. PATENT DOCUMENTS

| | | | |
|---|---|---|---|
| 8,579,341 B2* | 11/2013 | Greer | A47J 37/0786 294/131 |
| 2007/0000353 A1* | 1/2007 | Yu | B25B 27/0042 81/3.4 |

* cited by examiner

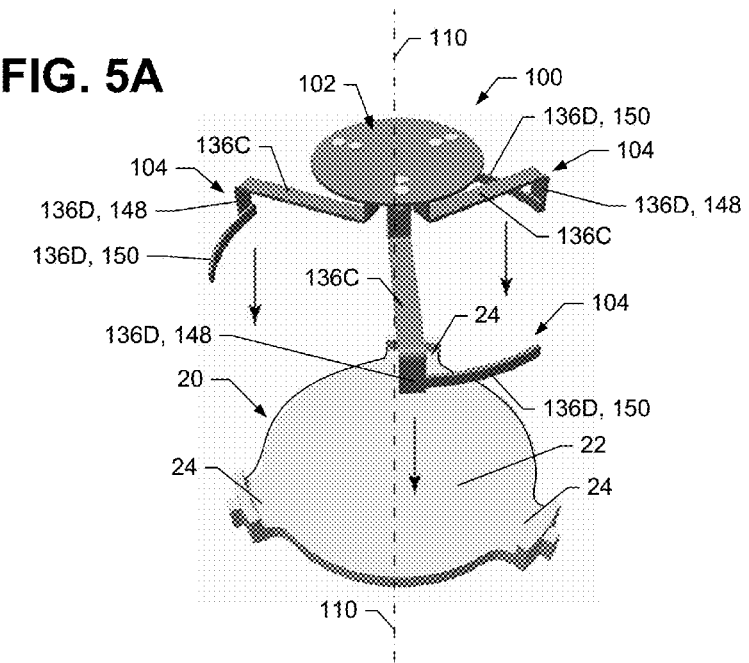
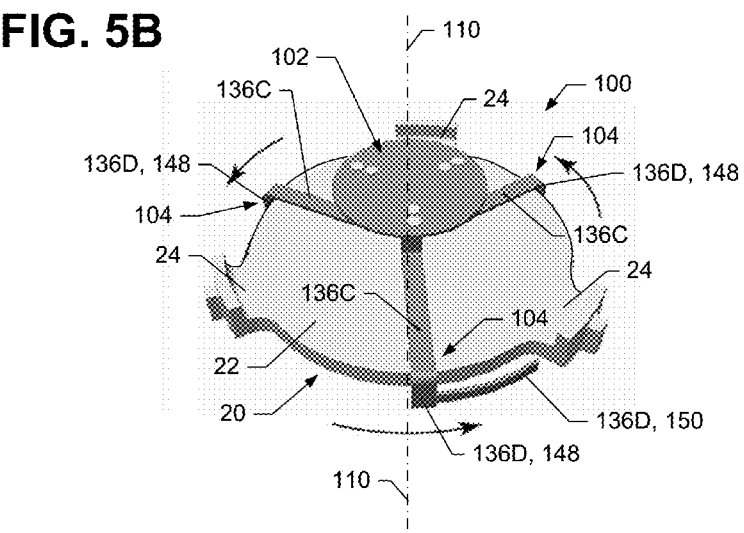

APPARATUS AND METHODS FOR MOVING OBJECTS NEEDING ECCENTRICALLY-LOCATED SUPPORT DURING MOVING

FIELD OF THE INVENTION

The present invention relates, generally, to the field of apparatuses and methods for moving objects and, more particularly, to hand tools and methods for moving objects from above needing eccentrically-located support during moving.

BACKGROUND OF THE INVENTION

When lifting or moving some objects, it may be necessary or best to engage and support such objects at locations offset or eccentric from their respective centers. This is particularly true with respect to objects having a central portion and multiple legs, lobes or other portions extending outwardly from the central portion. If such objects are supported during lifting and moving only beneath their central portions and are not supported beneath the outwardly extending portions at locations eccentric to the central portion, these objects may tend to become unstable and move unexpectedly, thereby possibly causing damage to the objects or harm to persons or other things in the vicinity of the objects.

One example of an object having a central portion and multiple portions extending outwardly from the central portion is a convection adapter used in some Kamado-style cookers to convert the cooker from using direct heating of food items being cooked to using indirect heating of food items being cooked. Generally, Kamado-style cookers include a lower portion in which fuel is burned to produce heat and hot gases, and an upper portion which aids in retaining the heat generated in the lower portion and that is present in the hot gases. Traditionally, a cooking grid is located within the lower portion to receive and support food items thereon during cooking and to allow exposure of the food items to the rising hot gases. As the hot gases rise from the lower portion to the upper portion in a predominantly vertical direction, the hot gases pass through slots in the cooking grid and come into direct contact with the food items. Heat from the hot gases is transferred to the food items through such direct contact, thereby cooking the food items. When configured and operated in this manner, Kamado-style cookers function somewhat like conventional grills with cooking of food items resulting substantially from direct contact with rising hot gases.

When a convection adapter is positioned with a Kamado-style cooker, foot items are cooked indirectly by causing hot gases to flow around and envelope the food items using a method similar to that of a convection oven. As illustrated in the top perspective, pictorial view of FIG. 1, a Kamado-style cooker 10 having a lower portion 12 formed by a wall 14 includes a fire ring 16 resting atop a fire box (not visible) in which fuel is burned. The fire ring 16 has a plurality of notches 18 for receiving and supporting a convection adapter 20 that may be inserted into or removed from the cooker 10 as desired by a user to convert the cooker 10 between cooking food items through direct contact with hot gases and cooking food items indirectly with hot gases flowing around the food items.

The convection adapter 20 comprises a disc-like portion 22 from which a plurality of legs 24 extend in different radial directions. When positioned in a Kamado-style cooker 10 as seen in FIG. 1, each leg 24 cooperatively resides within a respective notch 18 of the fire ring 16. Together, the convection adapter 20 and fire ring 16 define multiple channels 26 therebetween with each channel 26 having a cross-sectional shape corresponding to a portion of an annulus. A cooking grid may be placed atop the legs 24 of the convection adapter 20 for receiving and supporting food items directly thereon for cooking. Alternatively, a pan, dish, sheet or other cooking vessel containing food items for cooking may be placed on the disc-like portion 22.

During use of the Kamado-style cooker 10 with the convection adapter 20 in place, some of the hot gases rising from the fire box directly contact the lower side of the disc-like portion 22 of the convection adapter 20, causing the adapter 20 and any pan, dish, sheet or other cooking vessel thereon to become hot. Other rising hot gases flow through channels 26 and around food items whether present directly on a cooking grid or present in a pan, dish, sheet or other cooking vessel, to indirectly cook the food items.

If the user of the cooker 10 desires to cook certain food items directly after having cooked other food items indirectly using the convection adapter 20, the user must remove the adapter 20 from the cooker 10 by lifting the adapter 20 upward and then out of the cooker 10. Alternatively, if the user of the cooker 10 desires to cook certain food items indirectly after having cooked other food items directly without the convection adapter 20, the user must move the adapter 20 over the cooker 10 and then lower it onto the fire ring 16. Unfortunately, the fire ring 16 and cooker wall 14 will be hot in either case, increasing the possibility that the user may be burned or may mishandle the adapter 20 while attempting to insert the adapter 20 into or remove the adapter 20 from the cooker 10.

There is, therefore, a need for a hand tool and method for moving objects (including, but not limited to, a convection adapter for a Kamado-style cooker) from above that need support at eccentric locations thereof during such moving, and that solves these and other problems, issues, deficiencies or shortcomings of existing apparatuses and methods.

SUMMARY OF THE INVENTION

Broadly described, the present invention comprises an apparatus for moving objects from above that need support at eccentric locations thereof during moving and methods of using the apparatus to move such objects. According to an example embodiment, the apparatus comprises a hand tool including a handle and a plurality of interface members secured to the handle. The handle has an ergonometric shape comprising multiple lobes configured to receive and be comfortably grasped by a user's hand for raising, lowering, moving and manipulating the hand tool during use. The interface members depend from and extend outward from the handle to interact with and support an object being moved at multiple eccentrically-located object locations. Each interface member has an interaction portion adapted to engage and contact a respective portion of the object and to support the object at an eccentrically-located location. Each interface member is also configured to limit or restrict movement of the object relative to the tool during the object's movement. In use according to a method of the example embodiment, the hand tool is positioned above the object with the tool's central longitudinal axis generally aligned collinearly with the object's central longitudinal axis and with the tool's interface members respectively oriented at angular locations between the object's outwardly-extending portions. The hand tool is lowered relative to the object and is rotated about the tool's central longitudinal axis to position multiple interface members in contact with and at least partially beneath respective outwardly-extending portion of the object. Subsequently, the hand tool is raised to lift the object and may be moved with the object to a new location. By performing the steps of the method in reverse order, an already lifted object may be moved to, lowered and positioned in a new location.

Advantageously, the apparatus and methods enable a user to move an object from above the object and while the object is being supported from below at multiple eccentric locations of the object. During such movement, the apparatus restricts the object from moving relative to the apparatus in multiple directions and, together with the apparatus' support of the object from below at multiple eccentric locations, provides stability and reduces the possibility of the user being injured or other things being damaged.

Other uses, advantages and benefits of the present invention may become apparent upon reading and understanding the present specification when taken in conjunction with the appended drawings.

BRIEF DESCRIPTION OF THE DRAWINGS

FIGS. 5A-5C display pictorial views of steps of a method of using the hand tool of FIG. 2 to move an object in accordance with the example embodiment of the present invention.

DETAILED DESCRIPTION OF THE DRAWINGS

Figure 1:
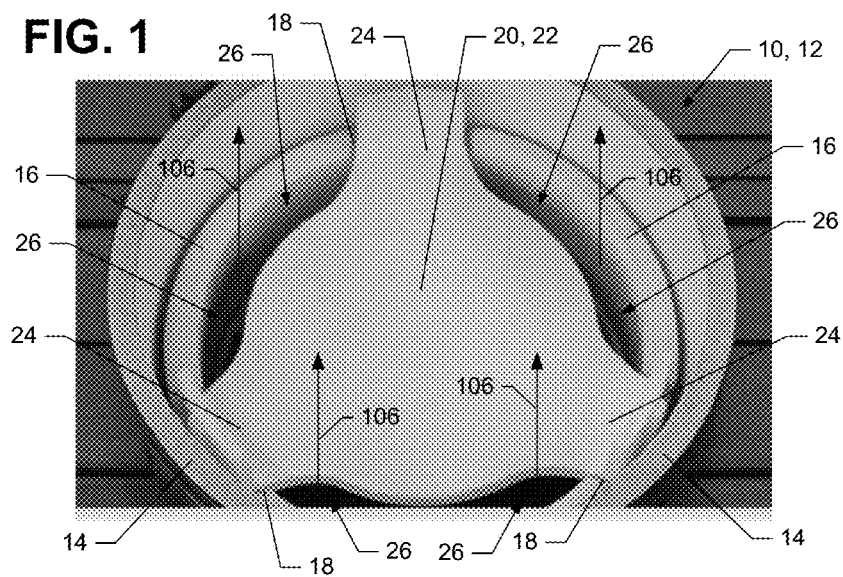
FIG. 1 displays a partial, perspective, pictorial view of a lower portion of a Kamado-style cooker having a convection adapter present therein.
Figure 2:
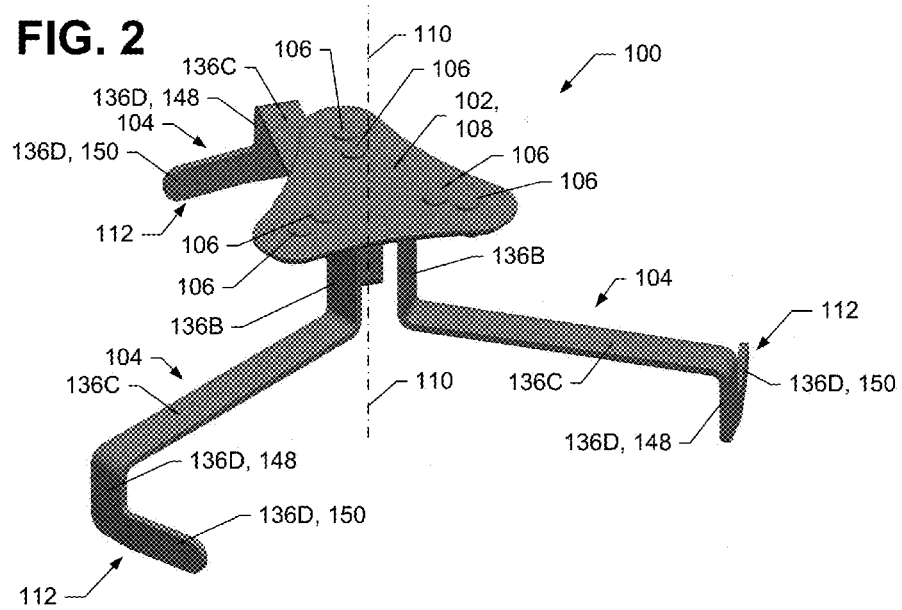
FIG. 2 displays a perspective, pictorial view of a hand tool for moving an object in accordance with an example embodiment of the present invention.

Referring now to the drawings in which like numerals represent like elements or steps throughout the several views, FIG. 2 displays a perspective, pictorial view of a hand tool 100 (also sometimes referred to herein as the "tool 100"), according to an example embodiment, for moving from above an object needing support at eccentric locations thereof. For purposes of this description, the object comprises a convection adapter 20 used in a Kamado-style cooker 10, but it should be understood and appreciated that the object may comprise any object having a central portion and portions extending outwardly therefrom that must be accessed, raised or lowered from above and that needs support, during moving, at multiple eccentric locations thereof. The hand tool 100 comprises a handle 102 and a plurality of interface members 104 secured to the handle 102 by multiple fasteners 106. The handle 102 has an ergonometric shape for receiving a user's hand comfortably and for allowing the user to exert forces on the handle 102 appropriate for raising, lowering, rotating, positioning, or carrying the hand tool 100 during use. The handle 102 comprises a substantially planar element having an upper surface 108 and an opposed lower surface (not visible) to which the interface members 104 are secured by fasteners 106. The interface members 104 depend initially from the handle 102 and subsequently extend in respective radial directions relative to a central longitudinal axis 110 of the handle 102. Each interface member 104 includes an interaction portion 112, described in more detail below, for interacting with and supporting an outwardly-extending portion of an object such as, for example, a respective leg 24 of a convection adapter 20.

Figure 3:
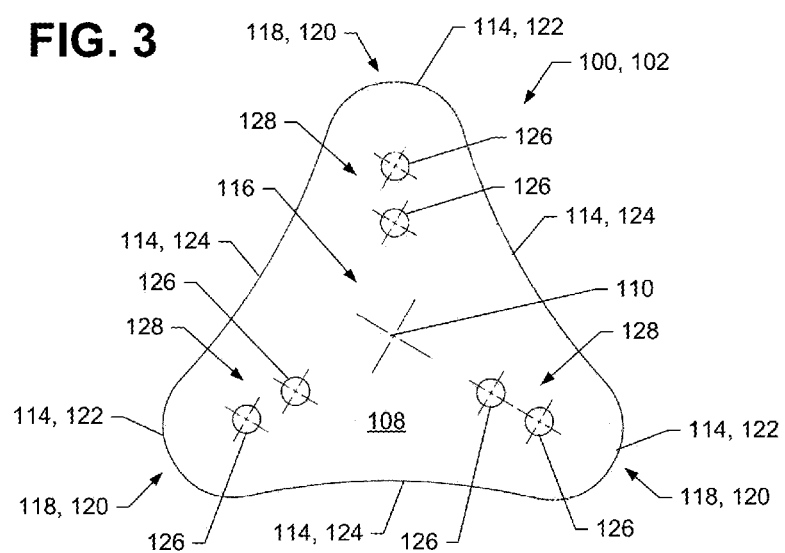
FIG. 3 displays a top plan view of a handle of the hand tool of FIG. 2.

FIG. 3 displays a plan view of the tool's handle 102 in accordance with the example embodiment showing the tool's upper surface 108. The handle 102, as seen in FIG. 3, has an edge 114 defining the handle's perimeter such that the edge 114 and, hence, the perimeter have a generally triangular shape in which the triangle's vertices are curved and the triangle's legs are bowed inward between the vertices. More particularly, the handle 102 comprises a body portion 116 and a plurality of lobe portions 118 with each lobe portion 118 extending from the body portion 116 in a substantially respective radial direction from the handle's central longitudinal axis 110 to a respective end 120. As seen in the plan view of FIG. 3, the portions 122 of the handle's edge 114 in the proximity of each lobe portion's end 120 define arcuate shapes and the portions 124 of the handle's edge 114 between each pair of lobe portions 118 define curvilinear shapes. The body and lobe portions 116, 118 are sized such that an average user's hand can grasp the handle 102 with his/her thumb extending over and about a first portion 124 of the handle's edge 114, his/her index finger extending over and about a second portion 124 of the handle's edge 114, and the remainder of his/her fingers extending over and about a third portion 124 of the handle's edge 114. Because, in the example embodiment, the portions 124 of the handle's edge 114 are identically shaped between lobe portions 118, a user may grasp the handle 102 with his/her thumb extending over and about any portion 124 of the handle's edge 114. It should be understood and appreciated, however, that while portions 124 of the handle's edge 114 are identically shaped between lobe portions 118 in the example embodiment, portions 124 of the handle's edge 114 may or may not be identically shaped between lobe portions 118 in other embodiments of the hand tool 100 with a result being that a user must grasp the tool 100 with his/her thumb over and about a particular portion 124 of the handle's edge 114 in such other embodiments.

The lobe portions 118 of the tool's handle 102 define a plurality of holes 126 extending between the handle's upper surface 108 and lower surface. The holes 126 are generally arranged in hole pairs 128, with the holes 126 of each hole pair 128 being defined along a radial direction relative to the handle's central longitudinal axis 110. Each hole pair 128 corresponds to a particular lobe portion 118 of the handle 102 and to a particular interface member 104. Each hole 126 of a hole pair 128 receives a fastener 106 to secure the corresponding interface member 104 to the respective lobe portion 108 and, hence, to the handle 102.

Figure 4:
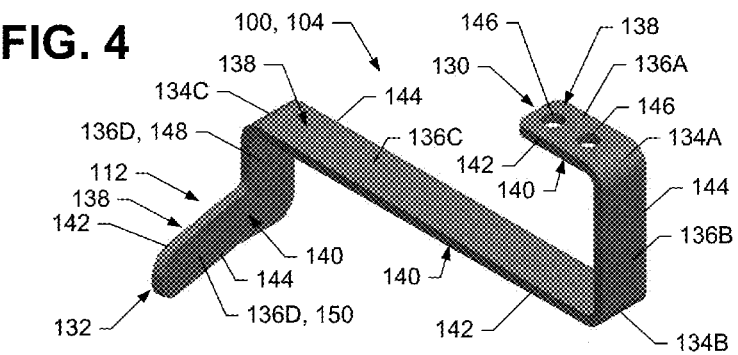
FIG. 4 displays a perspective, pictorial view of an interface member of the hand tool of FIG. 2.

According to the example embodiment, each interface member 104 of the hand tool 100 is substantially identical to the other interface members 104. FIG. 4 displays a perspective, pictorial view of a single interface member 104 of the hand tool 100 in accordance with the example embodiment. Because all of the tool's interface members 104 are substantially identical, the description herein with respect to the interface member 104 shown in FIG. 4 also applies to the tool's other interface members 104. As illustrated in FIG. 4, the interface member 104 comprises a generally elongate element extending between first and second ends 130, 132 and having multiple bends 134 defining multiple segments 136 between the first and second ends 130, 132. The interface member 104 has opposed first and second surfaces 138, 140 extending between the first and second ends 130, 132. The first and second surfaces 138, 140 define opposed first and second edges 142, 144 therebetween. The first and second edges 142, 144 extend between the member's first and second ends 130, 132.

The first segment 136A of the interface member 104 is located nearest the interface member's first end 130. The first segment 136A defines a plurality of holes 146 extending between the interface member's first and second surfaces 138, 140. The holes 146 receive fasteners 106 therein to secure the interface member 104 to the handle 102 with the member's first surface 138 adjacent and in contact with the lower surface of the handle 102. When secured to the handle 102, the first segment 136A of the interface member 104 resides in a plane substantially parallel to the plane of the handle 102.

The interface member's second segment 136B depends from the member's first segment 136A and extends longitudinally between bends 134A, 134B. The second segment 136B is substantially perpendicular to the interface member's first segment 136A. When the interface member 104 is secured to the handle 102, the second segment 136B is nearest and extends substantially parallel to, the tool's central longitudinal axis 110.

The third segment 136C of the interface member 104 extends for a substantial distance between bends 134B, 134C. The third segment 136C is substantially perpendicular to the member's second segment 136B and extends within a plane generally parallel to the plane in which the first segment 136A resides. When the interface member 104 is secured to the handle 102, the third segment 136C extends in a plane substantially parallel to the plane of the handle 102.

The interface member's fourth segment 136D depends from the member's third segment 136C and lies in a plane generally parallel to the plane in which the member's second segment 136B is present. The fourth segment 136D is substantially perpendicular to the member's third segment 136C and comprises a first portion 148 connected to the member's third segment 136C at bend 134C and a second portion 150 extending between the first portion 148 and the interface member's second end 132. The first portion 148 of the fourth segment 136D is present in a plane substantially parallel to the plane in which the member's second segment 136B resides. The second portion 150 of the fourth segment 136D is slightly curved to aid the tool 100 in moving objects already present near arcuate surfaces such as, for example and not limitation, a convection adapter already present within the lower portion of a cooker. When the interface member 104 is secured to the handle 102, the fourth segment 136D is farthest from the tool's central longitudinal axis 110.

Together, the first and second portions 148, 150 of the fourth segment 136D form an interaction portion 112 of the interface member 104 that interacts with an outwardly-extending portion of an object at an eccentric location along the outwardly-extending portion during the tool's use. The interaction portion 112 has a generally "L-shape" when viewed in a direction defined generally between bend 134C and bend 134B such that second portion 150 of the tool's fourth segment 136D is adapted to slide beneath an object's outwardly-extending portion with edge 142 contacting a lower surface thereof at an eccentric location to support the outwardly-extending portion (and, hence, the object itself) and prevent the object's downward movement relative to the tool 100 when the object is being moved. The first portion 148 of the tool's fourth segment 136D is adapted for edge 142 to engage and contact a generally vertical surface, edge or side of the object's outwardly-extending portion to limit the object's lateral movement relative to the tool 100 during movement of the object. Also, when some objects are being moved, the second surface 140 of the interface member 104 may engage and contact the upper surface of the object's outwardly-extending portion and/or the object's central portion, thereby limiting the object's upward movement relative to the tool 100.

Figure 5C:
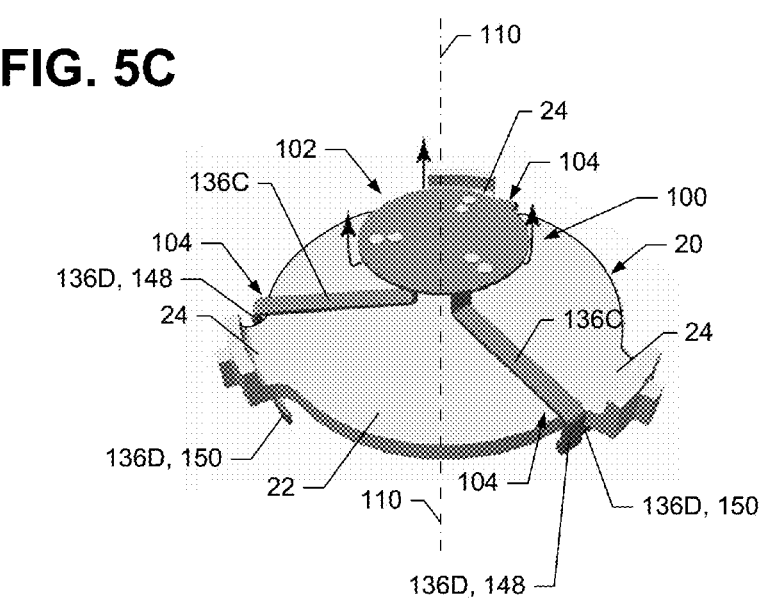

In use, the hand tool 100 allows a user to access an object from above and to safely move the object from above while the tool supports the object's outwardly-extending portions from below at multiple eccentric locations. FIGS. 5A-5C display use of the hand tool 100 in accordance with a method of the example embodiment to access, engage and move an object having a central portion and outwardly-extending portions, which in FIGS. 5A-5C comprises a convection adapter 20 for a Kamado-style cooker 10 as an example for the purpose of description. The method comprises a plurality of steps beginning with a first step illustrated in FIG. 5A in which the hand tool 100 is positioned vertically above the convection adapter 20 with the tool's central longitudinal axis 110 aligned with the adapter's central longitudinal axis and with the fourth segments 136D of the interface members 104 angularly oriented so that the fourth segments 136D will pass between angularly-adjacent pairs of legs 24 of the adapter 20 as the tool 100 is lowered relative to the adapter 20.

After such positioning of the hand tool 100, the user lowers the tool 100 with the longitudinal axes aligned until the third segment 136C of each interface member 104 comes into contact with the upper surface of the convection adapter 20. When the third segment 136C of each interface member 104 is in such contact with the adapter 20, the fourth segment 136D of each interface member 104 resides between angularly-adjacent pairs of legs 24 of the adapter 20. If the adapter 20 is present within a cooker 10 at such time, the fourth segment 136D of each interface member 104 will also pass within and at least partially through a channel 26 between the convection adapter 20 and fire ring 16.

According to a subsequent step of the method illustrated in FIG. 5B, the hand tool 100 is rotated about the tool's central longitudinal axis 110 by the user rotating the tool's handle 102 until the first portion 148 of each interface member's fourth segment 136D contacts the side of a respective leg 24 of the adapter 20 and the second portion 150 of each interface member's fourth segment 136D is present under a respective leg 24 of the adapter 20. The result of such rotation is seen in FIG. 5C, which also illustrates a subsequent step of the method involving the vertically lifting of the adapter 20 through use of the hand tool 100. In such subsequent step, the user exerts a force on the hand tool 100 by pulling the tool 100 in a generally upward vertical direction. If the convection adapter 20 is present within a cooker 10, exertion of such force serves to lift the adapter 20 from within the cooker 10. If the convection adapter 20 is hot, such as may be the case after cooking, the tool 100 permits removal of the adapter 20 absent contact between the user and the adapter 20.

Whereas the present invention has been described in detail above with respect to an example embodiment thereof, it should be appreciated that variations and modifications might be effected within the spirit and scope of the present invention.

What is claimed is:

1. An apparatus for moving an object, said apparatus comprising:
   a planar handle having a central longitudinal axis and comprising a body portion perpendicular to said central longitudinal axis, said planar handle further comprising a plurality of lobe portions extending from said body portion in respective radial directions relative to said central longitudinal axis; and a plurality of interface members adapted for positioning beneath and engaging the object at an eccentric location of the object, each said interface member being secured directly to said planar handle and extending away from said planar handle predominantly in a respective radial direction relative to said central longitudinal axis, each said interface member having a first end and a distant second end and comprising a plurality of segments between said first and second ends, and wherein a segment of said plurality of segments located nearest said second end comprises a first portion and a second portion arranged in an L-shape.

2. The apparatus of claim 1, wherein said first portion of said segment of said plurality of segments located nearest said second end extends parallel to said central longitudinal axis.

3. The apparatus of claim 1, wherein said second portion of said segment of said plurality of segments located nearest said second end extends curved relative to said central longitudinal axis.

\* \* \* \* \*